US006677864B2

(12) United States Patent
Khayrallah

(10) Patent No.: US 6,677,864 B2
(45) Date of Patent: Jan. 13, 2004

(54) METHOD FOR MULTICAST OVER WIRELESS NETWORKS

(75) Inventor: Ali S. Khayrallah, Apex, NC (US)

(73) Assignee: Telefonaktiebolaget L.M. Ericsson (SE)

( * ) Notice: Subject to any disclaimer, the term of this patent is extended or adjusted under 35 U.S.C. 154(b) by 0 days.

(21) Appl. No.: 10/125,253

(22) Filed: Apr. 18, 2002

(65) Prior Publication Data

US 2003/0200499 A1 Oct. 23, 2003

(51) Int. Cl.$^7$ .................................................. H03M 7/00
(52) U.S. Cl. ........................................ 341/50; 370/432
(58) Field of Search .......................... 341/50; 370/432, 370/431, 394; 455/466

(56) References Cited

U.S. PATENT DOCUMENTS

| 6,307,487 B1 | 10/2001 | Luby |
| 6,314,289 B1 | 11/2001 | Breiling et al. |
| 6,320,520 B1 * | 11/2001 | Luby ............................ 341/50 |
| 6,498,936 B1 * | 12/2002 | Raith ......................... 455/466 |

FOREIGN PATENT DOCUMENTS

| EP | 1182797 | 2/2002 |
| WO | WO99/16277 | 4/1999 |

OTHER PUBLICATIONS

"A Digital Fountain Approach to Reliable Distribution of Bulk Data" by John W. Byers, et al.; ACM Sigcomm 1998; 12 pages.
"Digital Fountain's Meta–Content Technology" 2001 Digital Fountain, Inc.; 19 pages.
Byers J W et al: "A Digital Fountain Approach to Reliable Distribution of Bulk Data " Computer Communications Review. Association for Computing Machinery, New York, US, vol. 28, No. 4, Oct. 1998, pp. 56–67, XP000914424 ISSN: 0146–4833.

Rizzo L et al: "RMDP: An FEC–Based Reliable Multicast Protocol for Wireless Environments" Mobile Computing and Communications Review, ACM, New York, NY, US, vol. 2, No. 2, Apr. 1, 1998, pp. 23–31, XP000738504 ISSN: 1091–1669.

Byers JW et al: "Accessing Multiple Mirror Sites in Parallel: Using Tornado Codes To Speed UO Downloads" Proceedings IEEE Infocom '99. 18$^{th}$ Annual Joint Conference of the IEEE Computer and Communications Societies. New York, NY, vol. 1, Mar. 21–25, 1999, pp. 275–283, XP00868811 ISBN: 0–7803–5418–4.

Malm P et al: "Optimum Data Rate in Cellular Systems" 1999 IEEE 49$^{th}$, Vehicular Technology Conference. Houston, TX, US, vol. 3 Conf. 49, May 16–20, 1999, pp. 1856–1860, XP000905718. ISBN: 0–7803–5566–0.

* cited by examiner

Primary Examiner—Brian Young
Assistant Examiner—John Nguyen
(74) Attorney, Agent, or Firm—Coats & Bennett, P.L.L.C.

(57) ABSTRACT

Multicast data in a wireless network is encoded with FEC codes where K information symbols are encoded into N transmission symbols, N>K, where K−N represents redundancy, such that reception and decoding of any K+A transmission symbols is sufficient to recover the K information symbols, where A is small relative to K. The level of redundancy may be selected to provide adequate performance to a mobile terminal at the edge of a cell, or to the mobile terminal reporting the lowest quality link. Upon handoff, a mobile terminal may be directed to an ongoing multicast in the new cell of the same information, or alternatively the new cell may transmit only the multicast packets the mobile terminal has not received. Different time segments of the information may be separately encoded, or the same information encoded with different level of redundancy, and the encoded data transmitted on different wireless channels.

32 Claims, 5 Drawing Sheets

METHOD FOR MULTICAST OVER WIRELESS NETWORKS

BACKGROUND OF THE INVENTION

The present invention relates generally to the field of wireless communications and specifically to a method for efficient multicast of data over wireless cellular networks.

The transfer of large amounts of information from one source to a plurality of destinations is of immense and growing importance. Traditional broadcast models (e.g., radio and television) are limited in both selection and time. That is, only a finite selection of content may be broadcast at any given time, and additionally all receivers must access the relevant transmission channel at the same time to receive a complete copy of the information.

One variation on the broadcast model, which exploits large transmission channel bandwidth, ameliorates these problems to some degree in a limited form of multicast. For example, the five most popular two-hour movies may be broadcast on separate cable television channels, and successively rebroadcast at 20-minute intervals. A subscriber may then select a movie and, if his or her selection is within the set of movies being multicast, be directed to the channel on which that movie is next scheduled to be broadcast. The subscriber would then experience a 0–20 minute delay (with an average delay of 10 minutes) before the movie begins. While this offers the subscriber some degree of choice in selection of the content, and the appearance of near-on-demand reception, the selection is limited to a relatively small subset that must be predicted by the broadcaster, and the initial delay can be significant. The scheme also requires extensive transmission channel bandwidth (30 channels for the example described), and either increasing the content selection or decreasing the perceived delay requires the allocation of additional channels.

Computer networks, such as the Internet, offer new options for transferring information from one or more sources to a plurality of destinations. Internet distribution allows for a larger degree of content selection on part of each recipient, and additionally reduces the start-up delay experienced by the recipient. The Internet, however, was initially developed to transfer low-volume and delay-tolerant data, such as e-mail and similar text files, static graphics, and hypertext information such as web page descriptions. Significant limitations constrain the transfer of large data volume and/or delay-intolerant content, such as digital video and audio information. Typical Internet data distribution comprises dividing the content into segments or packets, and transferring the packets through the network under a standard protocol, such as the Transfer Control Protocol/Internet Protocol (TCP/IP). To ensure reliable transfer of the data across the network, these protocols include an acknowledgement mechanism, whereby data receivers acknowledge the successful transfer of each packet back to the information source, and unacknowledged packets are assumed lost and retransmitted. While such protocols provide for robust data integrity, they may introduce significant delay and severely constrain the bandwidth of a particular data transmission, particularly as the acknowledge response times increase due to network distance between the source and destination. Additionally, the ability of a data broadcast source, or server, to provide content to a large plurality of users, or clients, is constrained by the server resources, as each data transfer connection typically requires the establishment of a separate TCP session, requiring allocation of memory and processing power. Thus, the ability of a large plurality of users to select and receive content from a given server is severely constrained.

To address these limitations on information delivery, it is known in the art to utilize particular classes of Forward Error Correction (FEC) encoding schemes, and to transmit the encoded packets outside of the constraints of traditional control protocols such as TCP/IP. In particular, some classes of FEC codes exhibit a specific characteristic, such that if enough of the encoded symbols are successfully received and decoded, regardless of which ones they are or in which order they are received, the original information may be reconstructed. For example, suppose K information symbols (i.e., sequences of bits in the information data) are encoded into a code word of N transmission symbols, where N>K, and N−K indicates the amount of redundancy added by the encoding process. The key requirement of the coding process is that the K information symbols can be reconstructed from any K out of the N transmission symbols, regardless of which K symbols are received.

One class of FEC codes that satisfies this key requirement exactly is called Reed-Solomon codes, which are well known in the art. Reed-Solomon codes are commonly employed, for example, in retrieving data from a storage medium such as an audio CD, where scratches or other imperfections may preclude receiving a precise copy of the stored data. The decoding of Reed-Solomon has been extensively studied. Efficient implementations of Reed-Solomon decoders have been developed, particularly in hardware.

A class of FEC codes that nearly satisfies the key coding requirement are referred to as Tornado codes. Using Tornado codes, K information symbols may be constructed from K+A of the N transmission symbols, where A is small relative to K (for example, A=√5K has been shown to be an effective value of A). These codes are less efficient, and require the reception of more transmission symbols to reconstruct the original information, than do Reed-Solomon codes. However, they are believed to be less computationally complex, and require less memory and fewer compute resources to implement in software, especially for very large block lengths. Tornado codes are described in Byers, et al., *A Digital Fountain Approach to Reliable Distribution Of Bulk Data*, ACM SIGCOMM (1998).

With the growth and technical sophistication of wireless communications services, wireless communications are widely anticipated to move beyond voice, paging, and e-mail content, and additionally to distribute graphic and multimedia content. The wireless communication network may be viewed as simply the last leg in the transmission across a conventional computer network, such as for example when a user accesses an Internet site from a wireless mobile terminal, and elects to receive multimedia content being multicast by the web server. In this scenario, since the wireless communication link exhibits erasure and error characteristics that are significantly different from the wire line Internet, increased efficiency may be realized by addressing the characteristics of the multicast as applied to the unique transmission medium. In the case where a wireless network server is itself the source of a multicast, and concomitantly has greater control over the formatting and transmission of the information, even greater efficiencies may be obtained.

SUMMARY OF THE INVENTION

The present invention includes a method of multicasting data over a wireless cellular communication network. The data, comprising K information symbols, is encoded to form a codeword of N transmission symbols, where N>K, in such a way that the K information symbols can be recovered from any K+A of the N transmission symbols. The N transmission symbols are transmitted from a base station in the wireless cellular communication network to a plurality of mobile terminals over a communication channel.

The encoding process may be such that A=0. The redundancy N−K may be chosen to provide adequate reception performance at the edge of the base station's cell. The redundancy may be chosen in response to channel quality information. The base station may vary the transmission power of the transmission symbols in response to channel quality information. Retransmission requests from a plurality of mobile terminals may be consolidated, and one or more transmission symbols retransmitted in response to the retransmission requests. The level of error correction coding and/or the transmission power may be adjusted in response to retransmission requests. Transmission symbols may be transmitted from different antennae or on different frequency hopping patterns.

The data may be divided into segments, each segment encoded separately, and transmission symbols from each encoded segment broadcast over a separate communication channel, which may be a TDMA time slot, a CDMA spreading encoding, an FDMA frequency, or a frequency hopping pattern.

The data may be encoded, and a plurality of transmission symbols transmitted in a first communication channel, with redundant transmission symbols transmitted in a second communication channel.

If a mobile terminal receiving information in a multicast is handed off to another base station, it may continue to receive transmission symbols, if they are being multicast in the second base station. If not, the second base station may begin to multicast the information from the beginning, or it may multicast only transmission symbols not received by the mobile terminal from the first base station.

DETAILED DESCRIPTION OF THE INVENTION

Figure 1:
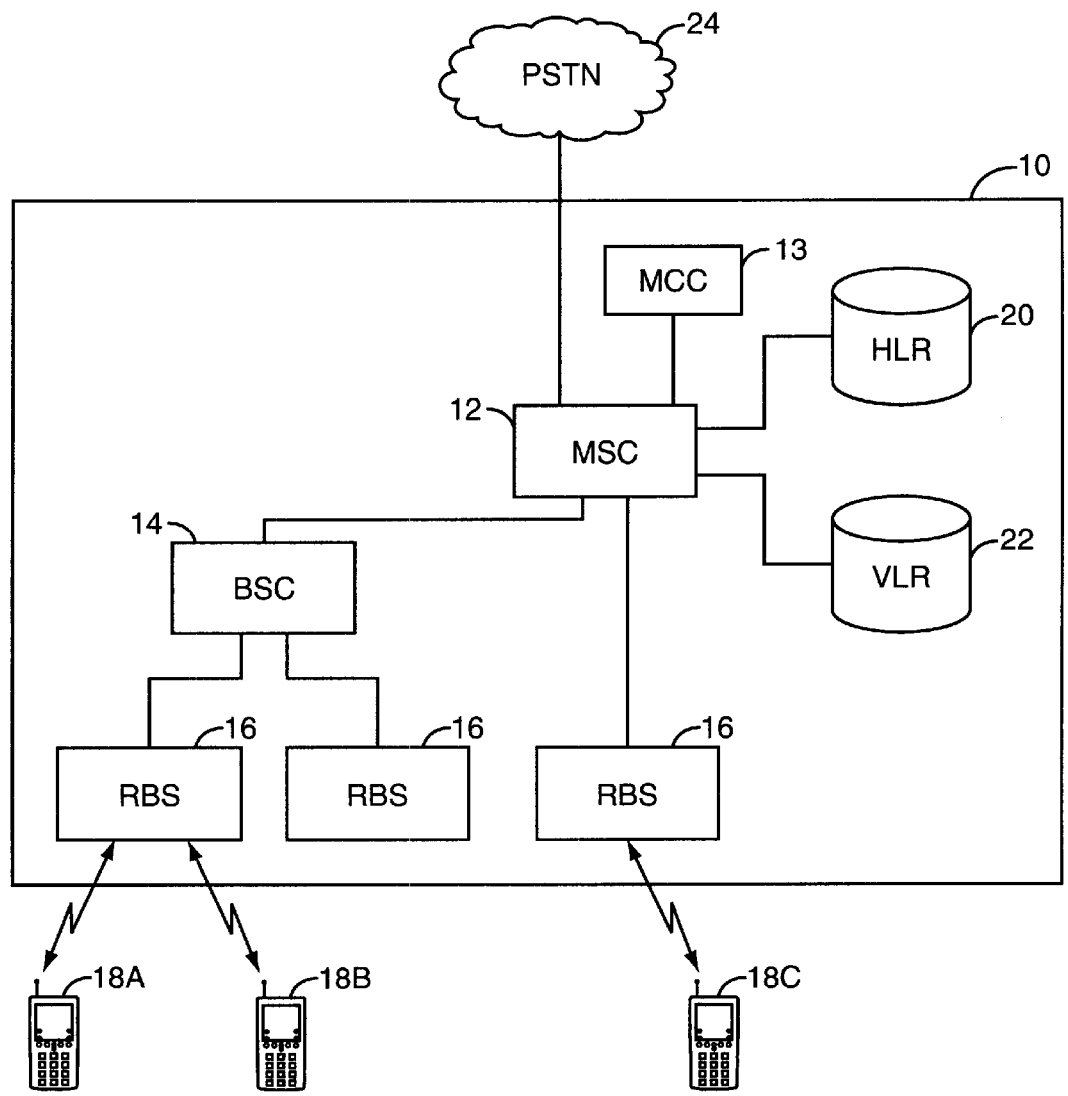
FIG. 1 is a functional block diagram of a representational wireless communication network.

A geographically limited portion of a typical wireless communication network 10 is depicted in FIG. 1. The network 10 contains a Mobile Switching Center (MSC) 12, a Base Station Controller (BSC) 14, a plurality of Radio Base Stations (RBSs) 16, a Home Location Register (HLR) 20, and a Visitor Location Register (VLR) 22. Note that the network 10 may include multiple instances of some or all of these elements in portions covering different geographic areas. RBSs 16 establish and maintain wireless voice and data communications links with mobile terminals 18, such as via radio frequency transmissions. Each RBS 16 communicates with mobile terminals 18 within its geographic coverage region, or cell. One or more RBSs 16 may be controlled by a BSC 14, which routes communications between the RBSs 16, or between an RBS 16 and an MSC 12. Alternatively, one or more RBSs 16 may be controlled directly by the MSC 12.

The MSC 12 is operative to connect calls between RBSs 16; between a RBS 16 and a RBS 16 connected to a different MSC 12 (not shown); or between a RBS 16 and another communication network, such as the Public Switched Telephone Network (PSTN) 24. The MSC 12 additionally controls the operation of mobile terminals 18 within the cells under its control. The MSC 12 selects one of a number of free communications channels, such as indicated by the BSC 14 to be available at the site, to be used by a mobile terminal 18 for call traffic, which may comprise speech or data. Alternatively, channel selection may be performed by the BSC 14. The selected communications channel may be a frequency, a timeslot, a CDMA code, a frequency hopping pattern or any combination of these, depending on the radio air-interface standard in use. The parameters of the selected traffic channel are sent to the mobile terminal 18 in a channel assignment message that is transmitted on the calling channel or on a temporary channel, which can both be referred to as a "call set-up channel." The mobile terminal 18 then leaves the call set-up channel and commences transmitting and receiving on the assigned traffic channel.

The MSC 12 is connected to a HLR 20, a database containing information associated with subscribers within the coverage area of MSC 12. Additionally, MSC 12 is connected to a VLR 22, a database used to store user information associated with visiting or "roaming" subscribers.

The wireless communication network 10 may further comprise a Multicast Control Center (MCC) 13 for providing multicast service to mobile terminal users in the form of multicast service messages. MCC 13 may perform Forward Error Correction (FEC) coding on information symbols, to generate transmission symbols having the properties described herein. The MCC 13 may then format and package the transmission symbols into multicast packets. The MCC 13 may additionally determine how frequently multicast packets containing the transmission symbols are broadcast, as well as which channels to use for the multicast packets. MCC 13 is connected to the MSC 12. The MCC 13 provides the content of, and instructions for, multicast packets to the MSC 12, which is responsible for the scheduling of the multicast packets. As will be readily understood by one of skill in the art, the MCC 13 may comprise, in a given implementation, software added to a general- or special-purpose computing platform within the MSC 12, and need not be a distinct network node or entity as depicted in FIG. 1.

Figure 2:
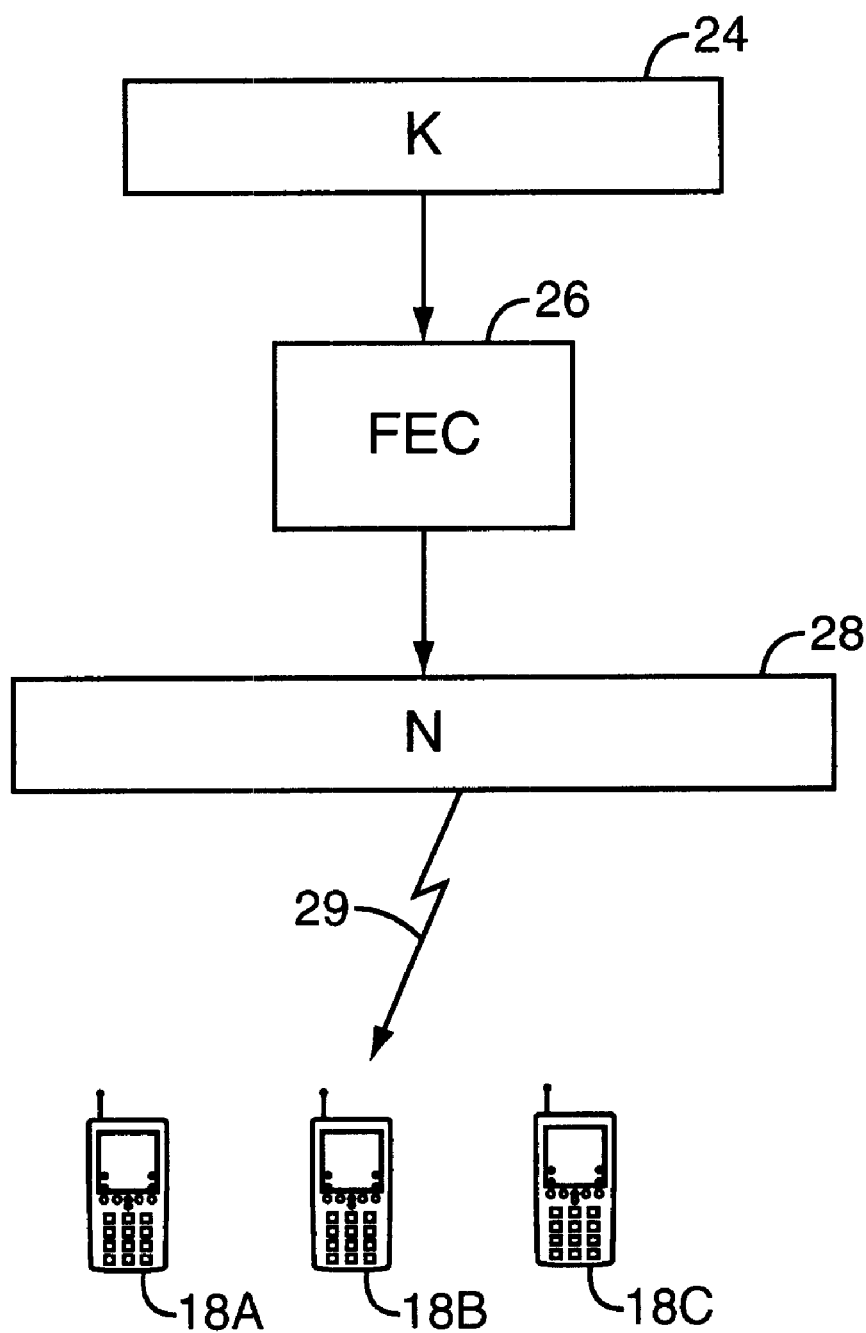
FIG. 2 is a block diagram depicting the encoding of information symbols into transmission symbols.

According to the present invention, the unique characteristics of the wireless communication system 10 may be advantageously exploited in the multicast of information from one or more RBSs 16 to a plurality of mobile terminals 18. Preliminarily, the information to be multicast is encoded according to a Forward Error Correction (FEC) code, as depicted in FIG. 2. The FEC code allows a receiver to reconstruct the original information when less than all of the encoded symbols are received. For example, K information symbols 24 may be encoded at block 26 into a codeword containing N transmission symbols 28, where N>K, and N−K represents redundancy. The N transmission symbols 28 are then multicast over a wireless communication channel 29 to a plurality of mobile terminals 18A, 18B, 18C. At each mobile terminal 18, the K information symbols 24 can be recovered from any K+A of the N transmission symbols 28, where A is small relative to K. One class of FEC codes 26 known to satisfy this requirement is referred to in the art as Tornado codes. Another class of FEC codes 26 that satisfy a more stringent formulation of this requirement (specifically, that A=0) is known in the art as Reed-Solomon codes. The delineation and description of two such FEC code families herein does not limit the scope of the present invention to these particular codes. Rather, these specific codes are described by way of example, to enable those of skill in the art to practice the present invention. Furthermore, the description of particular classes of FEC codes utilized to enable multicasting does not preclude the use of traditional coding techniques for other purposes, as known in the wireless communication arts. For example, the FEC code 26 may be applied, along with other known coding techniques, such as interleaving, convolutional coding, and the like, as an inner code. One or more outer codes, such as parity, encryption, Error Correction Codes (ECC), or the like, may be applied to the FEC-encoded N transmission symbols 28, to further enhance the reliability of the wireless communication from RBS 16 to mobile terminals 18.

The requirement of the FEC codes described above—that reception and decoding of less than all of the N transmission symbols is sufficient to recover the K information symbols—allows the wireless system 10 to multicast the information from one or more RBSs 16 to a plurality of mobile terminals 18 within the same cell (or sector) with improved efficiency. In many applications, information may be of interest to a plurality of mobile terminals 18 operating within a particular cell. Examples may include traffic or weather information that is local to the geographic area comprising the cell, or information related to an attraction within or proximate the cell, such as an amusement park, zoo, airport, distinct geographic feature, or the like. By multicasting the information, the wireless cellular communication system 10 consumes the minimum amount of air interface bandwidth, thus making maximum use of its system resources.

Additionally, precise temporal coordination among receivers is not necessary. For example, an RBS 16 may transmit N transmission symbols (in N or fewer multicast packets) representing K information symbols encoded according to the FEC codes as described above. As used herein, a multicast packet is a distinct transmission including at least one multicast transmission symbol. A first mobile terminal 18A may begin receiving and decoding the multicast packets beginning with the first such multicast packet transmitted. A second mobile terminal 18B may begin receiving and decoding the multicast packets at a later time, thus missing the initial multicast packets. However, so long as both mobile terminals 18A, 18B receive any K+A of the transmitted multicast packets, each mobile terminal 18A, 18B will be able to reconstruct the original K information symbols, and hence the entire information program. This maximizes the efficiency of the RBS 16 air interface, as the mobile terminal 18B does not need to request retransmission of the initial multicast packets (or alternatively, need not wait until a subsequent re-transmission to retrieve them).

Additionally, each of the mobile terminals 18A, 18B may miss one or more of the multicast packets, due to fading, interference, or other effect as is well known in the wireless communication arts, and furthermore the missed multicast packets may be different at each mobile terminal 18A, 18B. However, according to the present invention, the missed multicast packets may be ignored, and subsequent multicast packets received and decoded, subject only to the requirement that each mobile terminal 18A, 18B receive sufficient multicast packets to extract and decode at least K+A of the N transmitted transmission symbols.

Several mechanisms may be utilized to ensure sufficient quality of reception at each mobile terminal 18 within a cell to allow the mobile terminal 18 to recover the multicast data. In one embodiment, the degree of redundancy N−K encoded into each codeword may be selected such that a mobile terminal 18 located at the edge of the cell serviced by an RBS 16 receives at least K+A multicast packets with sufficient signal strength and data integrity to enable extraction and decoding of the transmission symbols. The RBS 16 may additionally adjust the density of error coding in an outer code of the multicast packets, and/or adjust their transmission power. These parameters may be determined empirically, through simulation, or by other means, as known in the art. Note that the encoding of information symbols into transmission symbols may actually occur at the MCC 13, the MSC 12, the BSC 14 or at other nodes within the wireless communication network 10. For simplicity of explication and without loss of generality, FEC coding decisions are discussed herein as occurring "at" the RBS 16, as this is the terminal point of the wireless communication network 10 as seen by the mobile terminal 18.

Figure 3:
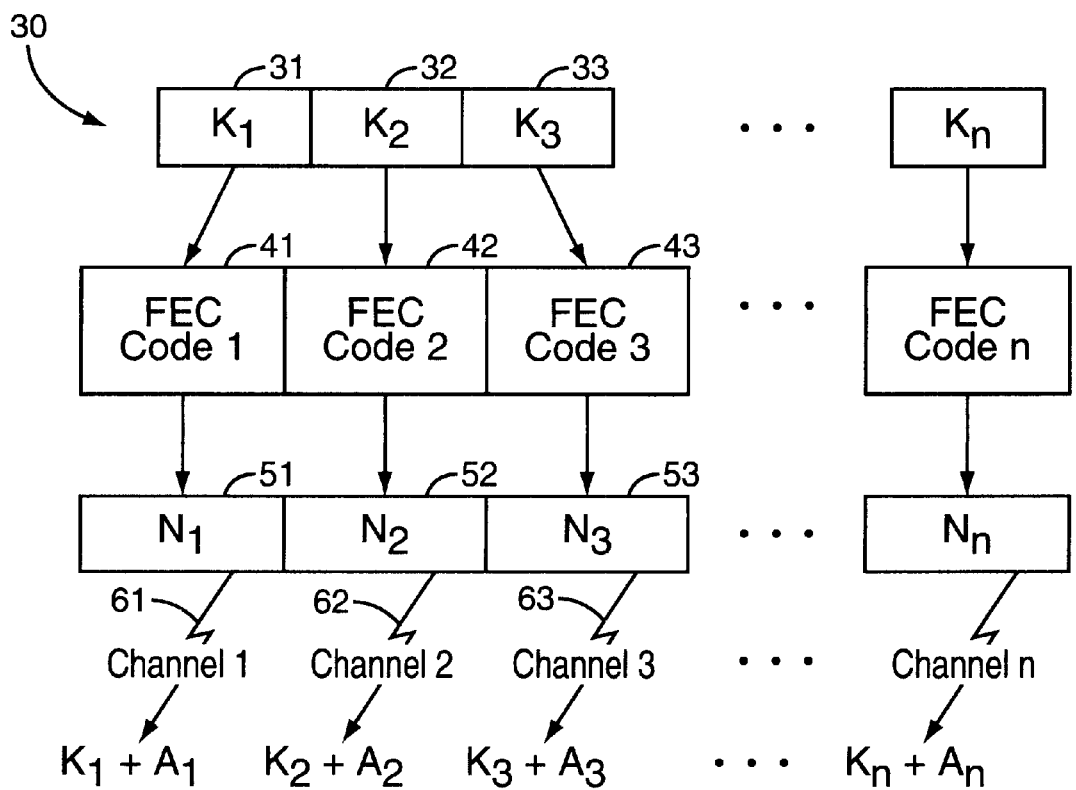
FIG. 3 is a block diagram depicting multi-segment encoding and transmission of temporal data according to one embodiment of the present invention.

In one embodiment of the present invention, with particular applicability to temporal or sequential data, such as for example audio and/or video content, the RBS 16 (or other network node) may divide the information stream into a plurality of segments in time, encode each segment separately, and multicast the plurality of bit streams in parallel, utilizing different channels of the transmission medium. This may reduce the perceived delay experienced by users in reproducing the information data stream, as a smaller number of transmission symbols are required to reconstruct a segment of the information. This process is depicted in FIG. 3.

A temporal data stream 30 is divided into multiple segments 31, 32, 33, each comprising some number $K_1$, $K_2$, $K_3$ of information symbols, respectively (where $K_1$, $K_2$, $K_3$ may or may not be equal). Each segment 31, 32, 33 is then encoded at blocks 41, 42, 43, respectively, utilizing a FEC code having the properties discussed above. The FEC code parameters at blocks 41, 42, 43 may be the same, but need not be. The encoding processes 41, 42, 43 each generate a corresponding set of transmission symbols 51, 52, 53, each of length $N_1$, $N_2$, $N_3$, respectively, where $N_1 > K_1$, $N_2 > K_2$, and $N_3 > K_3$. These sets of transmission symbols are concurrently transmitted by the RBS 16 in separate communication channels 61, 62, 63, and are subsequently received by, in general, a plurality of mobile terminals 18.

Each mobile terminal 18 will initially have none of the transmission symbols, and will begin to receive transmission symbols corresponding to sets $N_1$, $N_2$, $N_3$ as they are transmitted by the RBS 16. A mobile terminal 18 may begin to immediately decode $N_1$ transmission symbols, and may buffer $N_2$, $N_3$ transmission symbols (alternatively, depending on its memory and compute resources, the mobile terminal 18 may begin to concurrently decode all $N_1$, $N_2$, $N_3$ transmission symbols, and buffer the corresponding information symbols). Once the mobile terminal 18 has successfully received and decoded any $K_1+A_1$ of the $N_1$ transmission symbols, it may recover the $K_1$ information symbols, and begin to replay segment 31 of the data stream 30. Since $K_1+A_1$ is smaller than the K+A that would be required to recover the entire data stream 30 were it encoded as a single block into a single codeword of N transmission symbols, the replay of segment 31 begins sooner, and the perceived delay experienced by the user is less. As data stream segments 32, 33 are reconstructed from received information symbols corresponding to codewords 52, 53, respectively, these segments are appended to segment 31 and presented to the user of mobile terminal 18 as a continuous data stream 30.

The wireless communication channels 61, 62, 63 may, for example, comprise separate time slots within a data frame in a Time Division Multiple Access (TDMA) system. Similarly, in a Code Division Multiple Access (CDMA) system, the information symbol sets 51, 52, 53 may be independently frequency spread using orthogonal spreading codes (such as Walsh codes). The separate code channels may then be modulated and broadcast together across a wide frequency spectrum as is well known in the art. The channels may additionally comprise a frequency allocation in a Frequency Division Multiple Access (FDMA) system, or frequency hop pattern in a frequency-hopping system, as known in the art.

In addition to the temporal division of source data into multiple blocks, independently encoded and transmitted, as described above to reduce perceived latency, the division of source data is also useful in the presentation of content to users requesting different levels of quality of service or richness of content. For example, referring again to FIG. 3, the source data stream 30 may comprise a stereo audio signal. The source 30 may be divided such that a first subgroup 31 comprises the left+right audio components, from which monaural (mono) sound may be reproduced. A second subgroup 32 may comprise left-right audio components. A user requiring only mono audio may utilize a receiver that receives only transmission symbols 51, broadcast on channel 61, and recovers therefrom the $K_1$ subgroup of information symbols 31. A receiver with greater available resources may receive and decode the transmission symbols 51 on channel 61, and additionally receive and decode transmission symbols 52 on channel 62, recovering therefrom the $K_2$ subgroup of information symbols 32. This receiver may combine the left+right and left-right audio components to generate stereo sound.

The separation of source data 30 into subgroups comprising essential information and additional information allows some receivers to recover only the essential information, while ignoring the (to them) superfluous information. Other receivers, however, may recover both the essential and additional information, to provide a higher quality of service (i.e., a richer experience for the user). The same technique also allows receivers to access different levels of service. For example, in addition to the mono and stereo audio components discussed above, another channel may broadcast a series of images associated with the audio. Another channel may include black & white video, with the color video information broadcast on yet another channel. Additional channels may include overlaid services, such as closed captioning or foreign language audio. Still other channels may include additional video feeds, such as instant replay or views from different cameras. In this manner, a broad range of levels of service may be rendered by each receiver, depending on factors such as user preference or subscription level, the quality of the air interface link, and the bandwidth, memory, and other capabilities of the receiver.

Figure 4:
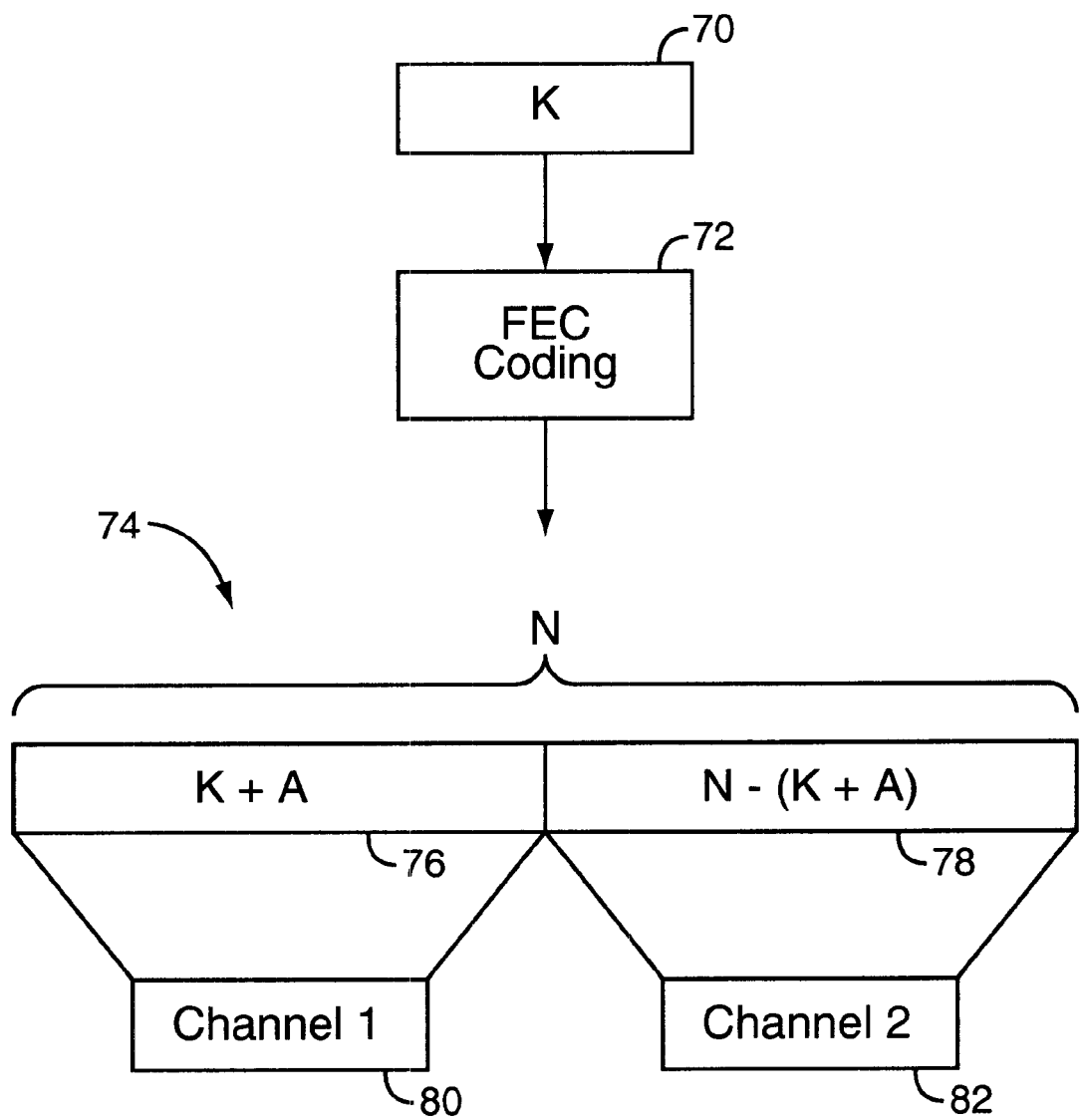
FIG. 4 is a block diagram depicting the transmission of data with incremental redundancy according to one embodiment of the present invention.

In another embodiment of the present invention, rather than broadcast separate segments or levels of the source data in separate channels, the same data may be broadcast in different channels, with each channel carrying additional redundancy. This embodiment is described with reference to FIG. 4. Source data 70, comprising K information symbols, is encoded at block 72 using an FEC code with the properties described above, to generate a codeword 74 comprising N transmission symbols, where N>K, and N−K represents redundancy. The codeword 74 is divided, in this example, into K+A transmission symbols 76 and the remaining N−(K+A) transmission symbols 78. The K+A transmission symbols 76 are transmitted on one wireless communication channel 80, and the N−(K+A) transmission symbols 78 are transmitted on another wireless communication channel 82. Note that the diagram in FIG. 4 depicts the number of transmission symbols only—preferably, the K+A transmission symbols 76 and the remaining N−(K+A) transmission symbols 78 are selected uniformly throughout the N transmission symbols 74 (such as, for example, on an odd/even basis). Incremental redundancy may, of course, be transmitted utilizing more than two channels, in a directly analogous manner. Additionally, the transmission symbols 76 broadcast on the first channel 80 need not be limited to K+A, but may comprise some fraction of the symbols between K+A and N, with the remaining symbols 78 broadcast on the second channel 82.

In this embodiment, a mobile terminal 18A, having a high quality link to the RBS 16 and receiving essentially all of the multicast packets transmitted, may receive and decode the transmission symbols from the first communication channel 80. The mobile terminal 18A may fully recover the original K information symbols 70 from the at least K+A transmission symbols transmitted on the first channel 80. A mobile terminal 18B, however, with a poor quality link to RBS 16, such as due to fading, interference, or the like, may experience a high degree of missed multicast packets, and may predict it will be unable to receive and decode K+A transmission symbols 76 on the first communication channel 80. Mobile terminal 18B may additionally receive and decode transmission symbols 78 on the second communication channel 82. These transmission symbols 78, distinct from the transmission symbols 76 on the first channel 80, provide additional redundancy, and may allow the mobile terminal 18B to successfully receive and decode a total of at least K+A transmission symbols, thus enabling it to fully recover the K information symbols of the source data 70, despite its poor quality link to RBS 16 and its relatively large multicast packet loss rate. As described above, channels 80, 82 may comprise TDMA time slots, CDMA spreading codes, FDMA frequencies, or orthogonal frequency patterns in a frequency hopping scheme, as known in the art.

In another embodiment, the RBS 16 may alter the parameters of transmission of multicast packets in response to indications of channel quality, such as for example from Received Signal Strength Indicator (RSSI) measurements reported by one or more mobile terminals 18 within its cell, reported Bit Error Rates (BER), or other channel quality indicators as known in the art. The RBS 16 may adjust the level of error correction coding on transmitted multicast packets, and/or adjust its transmission power, to provide satisfactory performance to the mobile terminal 18 reporting the lowest quality communication link. This ensures adequate reception by all other mobile terminals 18 within the cell.

If a mobile terminal 18 requests from the RBS 16 a retransmission of one or more multicast packets, the RBS 16 may retransmit the requested packets, which may be advantageously received and decoded by other mobile terminals 18 within the cell. In one embodiment, an RBS 16 may receive retransmission requests from a plurality of mobile terminals 18 within its cell, compare the retransmission requests, and select one or more multicast packets to retransmit such that the maximum number of the retransmission-requesting mobile terminals 18 may benefit from the retransmitted transmission symbols. One way to ensure efficient retransmission is to compare the status of different mobile terminals 18, and first retransmit as may symbols as possible that benefit all of those requesting retransmissions. Next, symbols that benefit smaller subsets of mobile terminals 18 are retransmitted. This process continues until symbols that benefit only single mobile terminals 18 are retransmitted last.

Note that the retransmission request analysis and multicast packet selection may be performed at the MCC 13, the MSC 12, or at another node within the wireless communication network 10, and the results transmitted to the RBS 16 for retransmission to mobile terminals 18. Additionally, the error coding and/or power level of the retransmitted packets may be selected based on the number of mobile terminals 18 that it is determined may advantageously benefit from the retransmission.

The number of retransmission requests receive by a RBS 16 may be considered a channel quality indicator. Thus, in one embodiment, the receipt of retransmission requests may itself cause the RBS 16 to alter the error correction coding and/or power level of subsequently transmitted multicast packets. This capability is particularly useful in the multicast of temporal data to a large number of mobile terminals 18. As the multicast begins, as discussed above, not all mobile terminals 18 need to begin reception of multicast packets at precisely the same time. Some mobile terminals 18 joining the multicast late may simply miss the initial packets, and will recover the full K information symbols, so long as they are able to successfully receive and decode any K+A of the N transmission symbols. Thus, these late-joining mobile terminals 18 may not initially request retransmission of missed packets, hoping to recover a sufficient number later. As the multicast progresses, however, these late-joining mobile terminals 18 may realize that they will not be able to receive a sufficient number of multicast packets. Additionally, as these or other mobile terminals 18 move through the cell, they may experience missed packets due to fading, interference, or the like. At some point into the multicast, the RBS 16 may begin to receive numerous retransmission requests. To preemptively prevent congestion on the reverse link (i.e., from the mobile terminals 18 to the RBS 16), the RBS 16 may, based on the receipt of retransmission requests, transmit remaining multicast packets with increased error correction coding and/or higher power levels, to increase the average reception and decoding rate among participating mobile terminals 18 in the cell. The increased error correction coding may be applied as an outer code; its purpose is to improve the chances of successful reception and decoding of the multicast packet at the mobile terminal 18. This error correction coding is in addition to the FEC coding already applied to enable the advantageous multicast properties.

A fundamental requirement of a wireless cellular communication system 10 is the ability to provide continuous communication services to a mobile terminal 18 as the mobile terminal 18 travels from one service area, or cell, to another. This process is known in the art as "handoff." According to the present invention, a mobile terminal 18 receiving and decoding multicast packets from one RBS 16 (referred to herein as the servicing RBS 16) may be efficiently handed off to another RBS 16 in a neighboring cell (referred to herein as the target RBS 16), while still receiving the multicast information.

Figure 5:
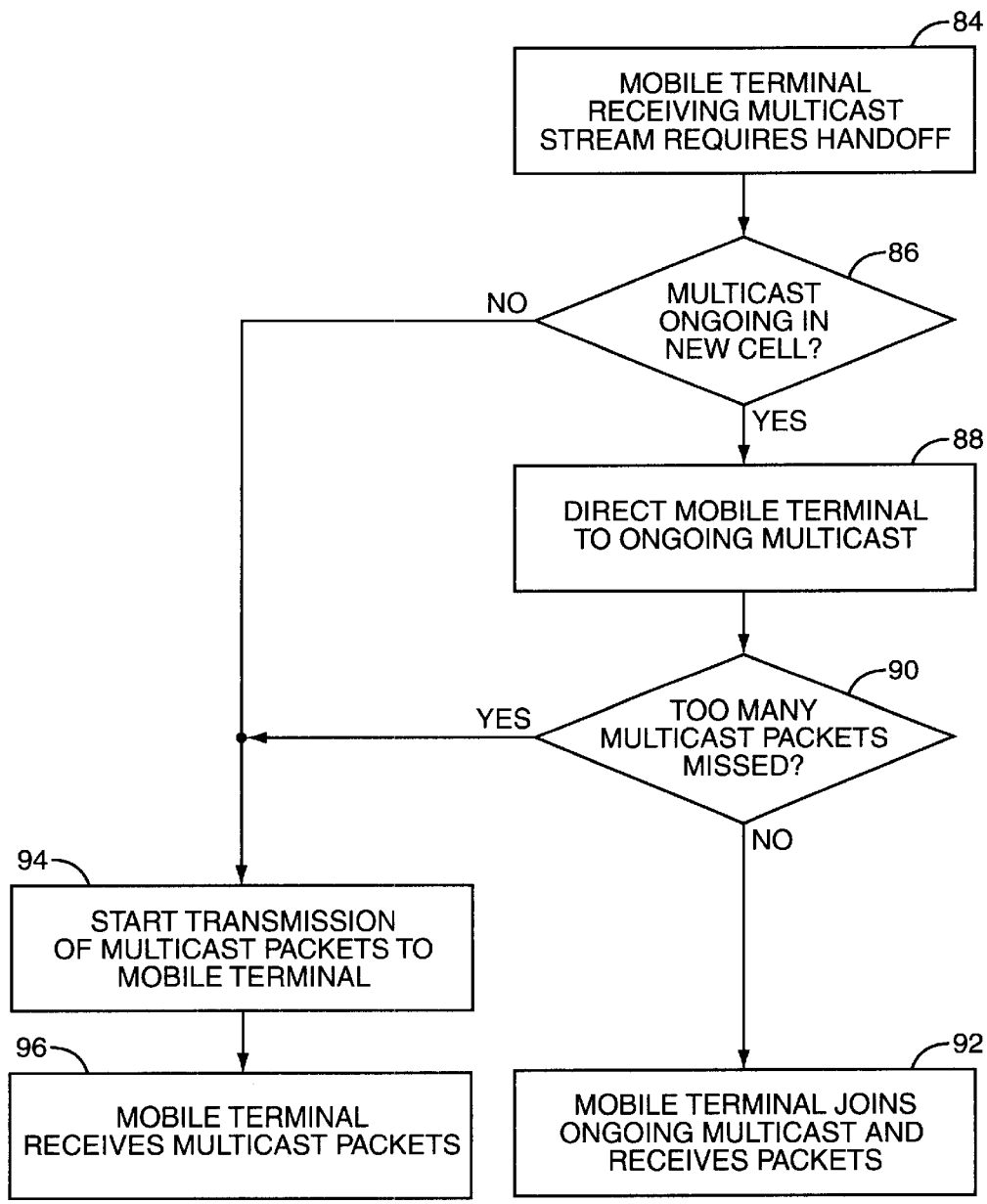
FIG. 5 is a flow diagram depicting a handoff procedure during a multicast.

If the servicing RBS 16 is the only RBS 16 multicasting packets corresponding to a given content selection, then as the mobile terminal 18 moves to a cell serviced by a different RBS 16, the mobile terminal 18 must be handed off from the servicing RBS 16 to the target RBS 16, using techniques that are well known in the wireless communication arts. However, if both the servicing RBS 16 and the target RBS 16 are engaged in the multicast of the same content selection—even though the two multicasts may not be synchronous or coordinated—the handoff of the mobile terminal 18 may be implemented with a minimum of system overhead. This process is described with reference to FIG. 5.

Initially, assume the mobile terminal 18 is receiving and decoding multicast packets transmitted by the servicing RBS 16. When received signal strength, link quality or other factors indicate that a handoff is required (step 84), a determination is made by the MCC 13 (or other network 10 node) whether the same information is being multicast by the target RBS 16 (step 86). If so, the mobile terminal 18 may simply be directed to the channel on which the target RBS 16 is transmitting multicast packets (step 88). The mobile terminal 18 may then receive and decode the multicast packets being broadcast by the target RBS 16. At this point, the mobile terminal may determine whether it has missed too many packets in the multicast in the target cell, and will be unable to recover at least K+A of the N transmission symbols from the target RBS 16 (step 90). If the mobile terminal 18 determines it has not missed too many multicast packets, it may simply continue to receive and decode multicast packets from the target RBS 16 (step 92). Once the mobile terminal has received and decoded any K+A of the N transmission symbols, it may recover the original information, regardless of the order of the received multicast packets, or from which RBS 16 the multicast packets were transmitted. If, however, upon receiving multicast packets from the target RBS 16, the mobile terminal 18 determines that it has missed too many multicast packets (step 90), or alternatively if the same information is not being multicast in the target cell (step 86), the target RBS 16 may begin multicasting the information to the mobile terminal 18 (step 94), as well as any other mobile terminal 18 in the cell that wishes to receive it. The mobile terminal 18 then receives the multicast packets (step 96), extracts and decodes the transmission symbols, and, upon receiving at least K+A transmission symbols, may reconstruct the original information in its entirety.

In one embodiment, if the target RBS 16 must start a new multicast of transmission symbols corresponding to the information, it simply begins a new multicast at step 94 from the beginning, and the mobile terminal 18 may discard those multicast packets it previously received from the servicing RBS 16 prior to the handoff. When the target RBS 16 begins transmitting multicast packets it has not previously received, the mobile terminal 18 receives the new multicast packets at step 96, and extracts and decodes the transmission symbols. This embodiment may be advantageous in the event that one or more additional mobile terminals 18 wish to receive the same information at or near the time of the handoff, as they may join the new multicast from (or near) the beginning.

In another embodiment, the target RBS 16 need not transmit multicast packets that the mobile terminal 18 already received from the servicing RBS 16. The target RBS 16 may transmit only the remaining multicast packets (i.e., those not already transmitted by the servicing RBS 16) at step 94. The mobile terminal 18 then receives the new multicast packets, extracts and decodes the transmission symbols therein, and continues its ongoing process of reconstructing the original information, at step 96. In this embodiment, the user experiences less perceived delay in replaying the information, as the handoff does not inject a significant delay in the receipt and decoding of the remaining information symbols. Information indicating which multicast packets have already been transmitted to the mobile terminal 18 may be received by the target RBS 16 from the servicing RBS 16 (or the MCC 13 or other network node) as part of the handoff process. Alternatively, the mobile terminal 18 may include this information as part of its request for the multicast packets from the target RBS 16.

As used herein, the term "mobile terminal" may include a cellular radiotelephone with or without a multi-line display; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of multicasting data over a wireless cellular communication network including at least one base station, comprising:

encoding K information symbols of said data to form a codeword of N transmission symbols, where N>K, such that the K information symbols can be recovered from any K+A of the N transmission symbols; and transmitting said N transmission symbols from a base station in said wireless cellular communication network to a plurality of mobile terminals over a communication channel.

2. The method of claim 1 wherein said N transmission symbols are each transmitted once, and wherein a plurality of mobile terminals may recover said data by receiving and decoding at least K+A of said N transmission symbols.

3. The method of claim 1 wherein encoding K information symbols of said data to form a codeword of N transmission symbols, comprises encoding said information using Tornado codes.

4. The method of claim 1 wherein A=0.

5. The method of claim 4 wherein said information is encoded using Reed-Solomon codes.

6. The method of claim 1 wherein the number N of transmission symbols in said codeword is selected such that the redundancy N−K is sufficient to provide adequate performance at the edge of said base station's cell.

7. The method of claim 1 further comprising:

receiving channel quality information at said base station from at least one mobile terminal; and varying said encoding responsive to said channel quality information.

8. The method of claim 7, wherein varying said encoding responsive to said channel quality information comprises increasing the redundancy N−K in said codeword in response to an indication of low channel quality.

9. The method of claim 1 further comprising:

receiving channel quality information at said base station from at least one mobile terminal; and varying the power at which said base station transmits said N transmission symbols responsive to said channel quality information.

10. The method of claim 9, wherein varying the power at which said base station transmits said N transmission symbols responsive to said channel quality information comprises increasing the transmit power in response to an indication of low channel quality.

11. The method of claim 1 further comprising:

receiving at said transmitter, from two or more mobile terminals, a request for retransmission of one or more of said transmission symbols;

consolidating said retransmission requests within said wireless cellular communication network, and retransmitting one or more of said transmission symbols responsive to said retransmission requests.

12. The method of claim 11 wherein consolidating said retransmission requests within said wireless cellular communication network comprises:

buffering two or more said retransmission requests;

comparing said buffered retransmission requests; and selecting one or more transmission symbols for retransmission based on said comparison.

13. The method of claim 11 wherein retransmitting one or more of said transmission symbols comprises retransmitting one or more of said transmission symbols at a power level selected in response to said retransmission requests.

14. The method of claim 11 wherein retransmitting one or more of said transmission symbols comprises retransmitting one or more of said transmission symbols with a level of error correction coding selected in response to said retransmission requests.

15. The method of claim 1 wherein said data are temporal, and wherein said wireless cellular communication network implements a multiplexing transmission protocol comprising two or more transmission channels, further comprising:

dividing said data into two or more temporal segments;

separately encoding each said temporal segment into two or more sets of transmission symbols; and transmitting transmission symbols from each of said two or more sets in different transmission channels.

16. The method of claim 15 wherein said multiplexing transmission protocol is TDMA, and wherein transmitting transmission symbols from each of said two or more sets in separate transmission channels comprises transmitting transmission symbols from each of said two or more sets in two or more time slots of a TDMA data frame.

17. The method of claim 15 wherein said multiplexing transmission protocol is CDMA, and wherein transmitting transmission symbols from each of said two or more sets in separate transmission channels comprises transmitting transmission symbols from each of said two or more sets encoded with a separate spreading code and multiplexed into a CDMA spread spectrum transmission.

18. The method of claim 1 wherein said data are divisible into one or more basic signals and one or more enhanced signals, and wherein said wireless cellular communication network implements a multiplexing transmission protocol comprising two or more transmission channels, further comprising:

dividing said data into at least one basic subgroups and one or more enhanced subgroups;

separately encoding each said subgroup into two or more sets of transmission symbols; and transmitting transmission symbols from each of said two or more sets in different transmission channels.

19. The method of claim 1 wherein said base station includes two or more antennae, and wherein transmitting said N transmission symbols comprises:

dividing said N transmission symbols into two or more sets, the number of sets corresponding to the number of antennae; and transmitting each said set of transmission symbols from a different antenna.

20. The method of claim 1 wherein said base station employs a frequency hopping protocol, and wherein transmitting said N transmission symbols comprises:

dividing said N transmission symbols into two or more sets; and transmitting each said set of transmission symbols on a different set of available frequencies.

21. The method of claim 1 wherein said wireless cellular communication network implements a multiplexing transmission protocol comprising two or more transmission channels, wherein transmitting said N transmission symbols comprises:

transmitting at least K+A of said N transmission symbols over a first channel; and transmitting additional transmission symbols over a second channel.

22. The method of claim 21 wherein said multiplexing transmission protocol is TDMA, and wherein said at least K+A of said N transmission symbols are transmitted in a first time slot of a TDMA data frame, and said additional transmission symbols are transmitted in a second time slot of the TDMA data frame.

23. The method of claim 21 wherein said multiplexing transmission protocol is CDMA, and wherein said at least K+A of said N transmission symbols are encoded with a first spreading code, said additional transmission symbols are encoded with a second spreading code, and both sets of transmission symbols are multiplexed into a CDMA spread spectrum transmission.

24. A method of receiving data transmitted over a wireless cellular communication network by at least one base station, said data comprising K information symbols coded into a codeword of N transmission symbols, where N>K, comprising:

receiving at least K+A transmission symbols at a first mobile terminal;

decoding at least K+A transmission symbols at said first mobile terminal to recover said K information symbols of said data;

receiving at least K+A transmission symbols at a second mobile terminal; and decoding at least K+A transmission symbols at said second mobile terminal to recover said K information symbols of said data.

25. The method of claim 24 wherein said K+A transmission symbols received at said second mobile terminal are different than said K+A transmission symbols received at said first mobile terminal.

26. The method of claim 24 wherein the step of receiving at least K+A transmission symbols at a second mobile terminal begins later than the step of receiving at least K+A transmission symbols at a first mobile terminal.

27. The method of claim 24 further comprising:

requesting retransmission of at least one transmission symbol by said first mobile terminal; and receiving a retransmitted transmission symbol at said second mobile terminal, said transmission symbol retransmitted in response to said request by said first mobile terminal.

28. A method of handing off a mobile terminal from a first base station to a second base station in a wireless cellular communication network, said mobile terminal receiving data multicast from said first terminal, comprising:

encoding at said first base station K information symbols of said data into a codeword of N transmission symbols, where N>K, such that the K information symbols can be recovered from any K+A of the N transmission symbols;

transmitting a series of said information symbols from said first base station;

handing off said mobile terminal from said first base station to said second base station; and if said second base station is engaged in transmitting a series of transmission symbols from said codeword, continuing transmitting said transmission symbols, such that said mobile terminal may receive the K+A transmission symbols from said second base station that it did not receive from said first base station.

29. The method of claim 28 further comprising:

if said second base station is not engaged in transmitting a series of transmission symbols from said codeword, transmitting a series of transmission symbols from said codeword in response to said handoff.

30. The method of claim 28 wherein transmitting a series of transmission symbols from said codeword in response to said handoff comprises transmitting only transmission symbols from said codeword that were not transmitted from said first base station.

31. The method of claim 28 further comprising:

if said second base station is not engaged in transmitting a series of transmission symbols from said codeword, transmitting a series of transmission symbols from said codeword in response to a request from said mobile terminal.

32. The method of claim 31 wherein said request from said mobile terminal additionally indicates which transmission symbols of said codeword said mobile terminal received from said first base station, and wherein transmitting a series transmission symbols from said codeword in response to a request from said mobile terminal comprises transmitting only transmission symbols from said codeword that were not transmitted from said first base station.

* * * * *